United States Patent Office 3,792,163
Patented Feb. 12, 1974

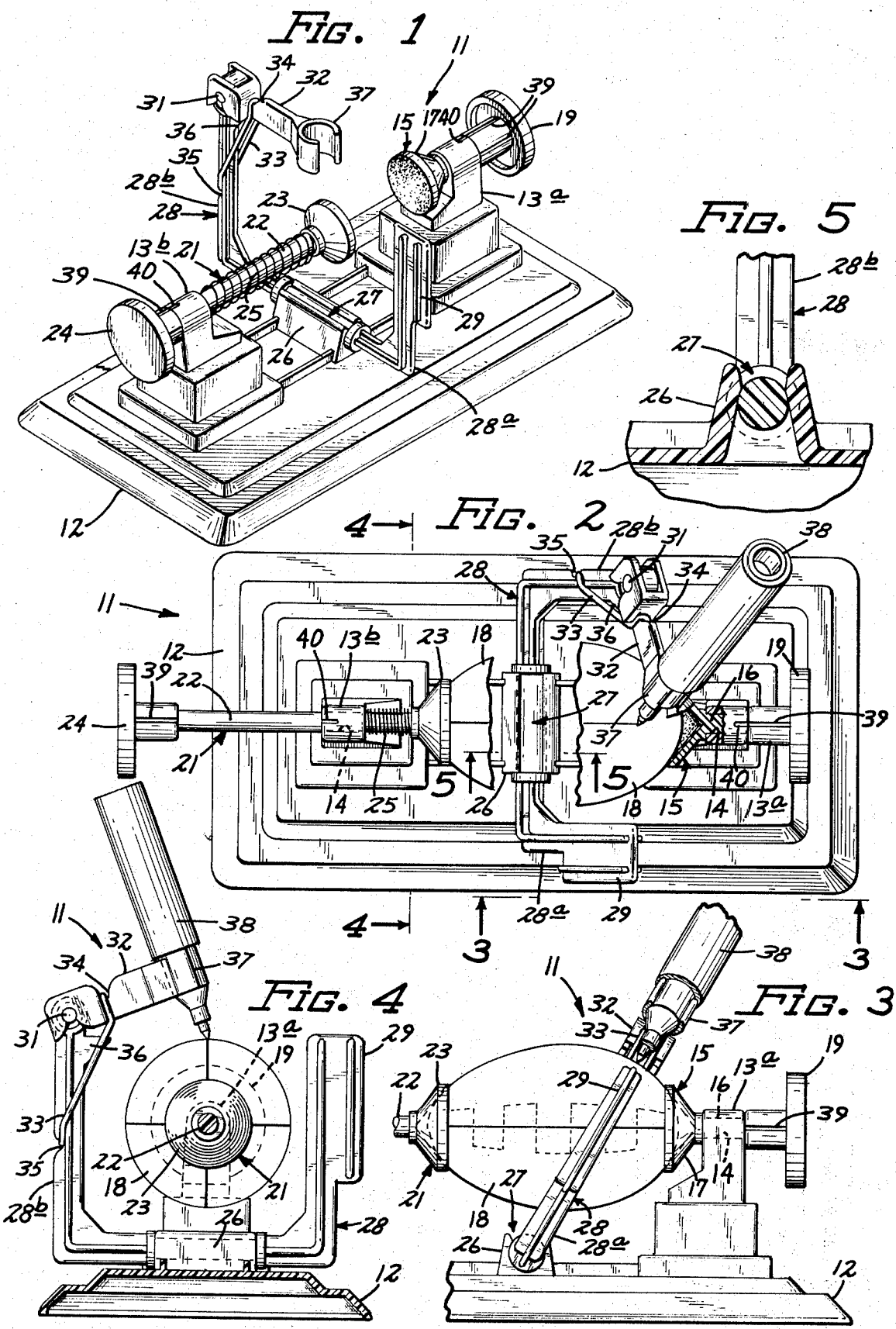

3,792,163
EGG DECORATING DEVICE
Stanley J. Fudro, Minneapolis, Minn., assignor to Toys 'N Things, Inc., Minneapolis, Minn.
Filed May 8, 1972, Ser. No. 251,337
Int. Cl. B43l 9/00, 11/00, 13/00
U.S. Cl. 33—21 D
15 Claims

ABSTRACT OF THE DISCLOSURE

Apparatus for decorating eggs and the like. The apparatus includes means for supporting an egg for rotation about its longitudinal axis and an arm member adapted to carry a marking device and arranged for marking movement longitudinally of the egg. Coordinated rotation of the egg and manipulation of the arm member together result in creating decorative marking on the egg.

---

The invention is related generally to apparatus for decorating eggs and the like, and is specifically directed to an egg decorating device usable by children.

As is well known, egg decorating is enjoyed by all children and attains its maximum popularity during the Easter season by reason of the traditional connection of decorated eggs with the activities of a widely renowned bunny.

The decoration of Easter eggs is not, however, usually enjoyed by mothers as much as it is by children because of the methods and techniques involved. Specifically, the most widely practiced method involves immersing each egg in a liquid dye solution which colors the egg and usually other things as well. Since it is children who are usually involved with this activity, the procedure usually results in coloring of the eggs and also in an area of general untidiness for which the childen do not deem themselves responsible.

My invention, therefore, contemplates apparatus for uniquely decorating eggs in a novel manner and without the mess attended by most egg decorating methods. Specifically, my egg decorating apparatus comprises a pair of spaced, colinear members rotatably carried by a base support and urged toward each other to receive an egg therebetween. Rotation of either colinear member effects rotation of the egg about its longitudinal axis. An arm member adapted to hold a marking device is pivotally mounted to the base support and arranged so that the marking device can be moved longitudinally of the egg and in marking engagement with its surface. Coordinated manipulation of the colinear members and the arm member results in decorative marking of the egg.

It will be appreciated that the inventive device is capable of coloring an entire egg with a single color if so desired, but the use of different colors and different size marking tips can result in endless variations of decorative designs limited only by ingenuity of the user. The apparatus is easily adapted for construction from low cost plastic, thus giving rise to an inexpensive item capable of holding the attention of a child of virtually any age for a significant period of time.

BRIEF DESCRIPTION OF THE DRAWINGS

FIG. 1 is a perspective view of an egg decorating device or apparatus embodying the inventive principle;

FIG. 2 is an enlarged view in top plan of the egg decorating apparatus with a marking device mounted thereon;

FIG. 3 is a fragmentary view in side elevation of the egg decorating apparatus;

FIG. 4 is an end view of the egg decorating apparatus; and

FIG. 5 is a sectional view taken along the line 5—5 of FIG. 2.

DESCRIPTION OF THE PREFERRED EMBODIMENT

With initial reference to all of the figures, an egg decorating apparatus embodying the inventive principle is represented generally by the numeral 11. With two exceptions, as will be evident below, the apparatus 11 is preferably formed from low cost plastic to provide a relatively inexpensive novelty item.

Apparatus 11 includes a base support 12 having a plurality of levels or tiers for both structural support and esthetic appeal. Projecting upwardly from the top tier or level are a pair of standards 13a and 13b which are spaced apart and arranged in general alignment. Each of the standards 13a and 13b has a circular bore 14 formed therethrough, the bores 14 being disposed in colinear relation.

A first egg supporting member 15 is rotatably disposed in the circular bore 14 of the standards 13a. The egg carrying member 15 comprises a short shaft 16 the inward end of which terminates in a cup-shaped member 17 constructed to receive one end of an egg 18. Preferably, the inner surface of the cup-shaped member 17 is coated with a frictional material to resist slippage between itself and the egg upon rotation. Such rotation is effected by a handle 19 disposed on the outward end of the shaft 16.

A second egg carrying member 21 is rotatably disposed in the circular bore 14 of the standard 13b. Egg carrying member 21 comprises a longer shaft 22 and an identical cup-shaped member 23 and handle 24. The inner surface of cup-shaped member 23 is similarly coated to prevent slippage with the egg 18.

By reason of its length, shaft 22 is axially movable within the circular bore 14, and a coil spring 25 acting between the inner face of the standard 13b and the cup-shaped member 23 normally urges the egg carrying member 21 toward the egg carrying member 15. Thus, it will be appreciated that, by reason of the colinear relationship of the member 15 and 21 and the urging of coil spring 25 that an egg 18 can be rotatably carried therebetween. The egg 18 is inserted by retracting the egg carrying member 21 against the bias of spring 15, placing the egg ends in a position where they are received by the respective cup-shaped members 17 and 23, and thereafter allowing the member 21 to engage the egg 18.

Disposed between the standards 13a and 13b on the top surface of the base support 12 is a projecting member 26 defining an elongated circular slot 27. The central portion of a U-shaped arm member 28 snaps into the slot 27 and is pivotally carried for swinging movement thereby. One upstanding side, designated 28a, of the U-shaped arm member 28 defines a handle 29 for manual manipulation thereof. The other upstanding portion, designated 28b, terminates in a transverse pin 31 which pivotally receives the bifurcated end of a secondary arm member 32. A small rubber band 33 is stretched between a slot 34 formed in the top edge of secondary arm member 32 and a slot 35 disposed at an intermediate point on the upstanding portion 28b of arm member 28 normally urges the arm member 32 downwardly. A triangular member 36 integrally formed on the inner edge of the upstanding portion 28b immediately below the transverse pin 31 acts as a stop for the arm 32.

The extreme end of secondary arm member 32 defines an arcuate bifurcation 37 constructed to receive and hold a marking device 38. This construction permits removal of the marking device 38 and replacement with another of different color or size. The length of secondary arm 32 is chosen so that the tip of marking device 38 engages the surface of an egg 18 essentially at the extreme top thereof. This marking engagement is, of course, effected by the downward biasing force of rubber band 33 acting on the secondary arm 32.

In operation, an egg 18 is inserted between egg carrying members 15 and 21 as described hereinabove. With a marking device 38 of desired color inserted into the arcuate bifurcation 37 of secondary arm member 32, the egg 18 can be decorated by rotation of either handle 19 or 24 to rotate the egg 18 relative to the marking movement of the device 38 longitudinally of the egg 18, or by a coordinated manipulation of both. The provision of a plurality of indicating lines 39 on handles 19 or 24, which register at ninety (90) degree intervals with an indicating line 40 on the top of each standard 13a, 13b, enables precisely controlled patterns to be made on the egg 18.

It will be appreciated that the egg 18 can be decorated with an endless variety of designs in a plurality of colors, thus making each egg uniquely different. It will be further apparent that the entire egg decorating procedure can be accomplished by children of any age without creating the mess which accompanies conventional egg decorating.

I claim:
1. An egg decorating device comprising:
 (a) a supporting frame;
 (b) first and second standard means supported by the frame in spaced relation, the first and second standard means each being adapted to receive one end of an egg and each being rotatable relative to the frame about a first axis, whereby the egg can be manually rotated about its longitudinal axis;
 (c) and arm means pivotally carried by the supporting frame for swinging movement about a second axis, said second axis being disposed between the first and second standard means, transverse to and spaced from the first axis;
 (d) the arm means further comprising means for holding a marking device in engageable relation to the egg, said holding means being disposed on essentially the opposite side of said first axis from the second axis and being arcuately movable to follow the longitudinal contour of the egg.

2. The egg decorating device defined by claim 1, wherein each of said first and second standard means comprises:
 (a) a standard member carried by the supporting frame;
 (b) and a shaft member rotatably carried by the standard member in colinear relation with said first axis, the shaft member terminating in a cup-shaped member to receivably support one end of the egg.

3. The device defined by claim 2, wherein at least one of the shaft members further comprises handle means for manual rotation thereof.

4. The device defined by claim 3, and further comprising indicia means on said one shaft member for indicating the rotational position thereof.

5. The device defined by claim 2, and further comprising means for urging one of said shaft members toward the other.

6. The device defined by claim 5, wherein the urging means comprises a coil spring compressibly disposed between said one shaft member and the associated standard member.

7. The device defined by claim 1, wherein the arm means comprises first and second arm members, the first arm member being pivotally connected to the frame for rotational movement about said second axis relative to said egg, and the second arm member is pivotally connected to the first arm member for movement toward and away from said egg, said second arm member being constructed to releasably hold said marking device.

8. The device defined by claim 1, and further comprising biasing means for normally urging the marking device toward said egg.

9. The device defined by claim 7, and further comprising biasing means for normally urging the second arm member toward said egg.

10. The device defined by claim 9, wherein the biasing means comprises a rubber band stretchably connected between the first and second arm members.

11. An egg decorating device comprising:
 (a) a base;
 (b) first and second standard means projecting upwardly from the base in spaced relation, the first and second standard means each being adapted to receivably support one end of an egg and each being rotatable about a first axis, whereby the egg can be rotated manually about its longitudinal axis;
 (c) a U-shaped primary arm member having a central portion and upstanding side portions, the central portion being pivotally mounted to the base between the first and second standard means for rotation about a second axis which is essentially normal to and spaced from the first axis, the upstanding side portions being rotatable about said second axis on opposite sides of the first axis;
 (d) a second arm member pivotally connected to one of said upstanding side portions for swinging movement toward and away from the egg, the end of the secondary arm member being constructed to hold a marking device in engageable relation to the egg and arcuately movable to follow the longitudinal contour of the egg.

12. The device defined by claim 11, wherein the other upstanding saide portion comprises a handle for rotating the primary arm member about said second axis.

13. The device defined by claim 11, wherein the central portion of the U-shaped primary arm member is removably secured to the base.

14. The device defined by claim 13, wherein the secondary arm member is removably secured to said one upstanding side portion of the U-shaped primary arm member.

15. The device defined by claim 11, and further comprising a rubber band stretched between the primary and secondary arm members to urge said secondary arm membe toward the egg.

References Cited

UNITED STATES PATENTS

| | | | |
|---|---|---|---|
| 3,484,797 | 12/1969 | Barnett et al. | 33—21 R |
| 236,432 | 1/1881 | Higbee | 33—21 D |
| 117,208 | 7/1871 | Richardson | 33—21 D |
| 134,498 | 12/1872 | Von Hofe | 33—21 D |
| 1,043,322 | 11/1912 | Kountz | 33—21 R |
| 1,298,753 | 4/1919 | Mathy | 33—21 D |
| 537,125 | 4/1895 | Rovensky | 33—21 D |

FOREIGN PATENTS

| | | | |
|---|---|---|---|
| 654,337 | 6/1951 | Great Britain | 33—21 D |

HARRY N. HAROIAN, Primary Examiner